Oct. 3, 1961  N. M. STEFANO  3,002,711
HELICOPTER
Filed Sept. 5, 1956  4 Sheets-Sheet 4
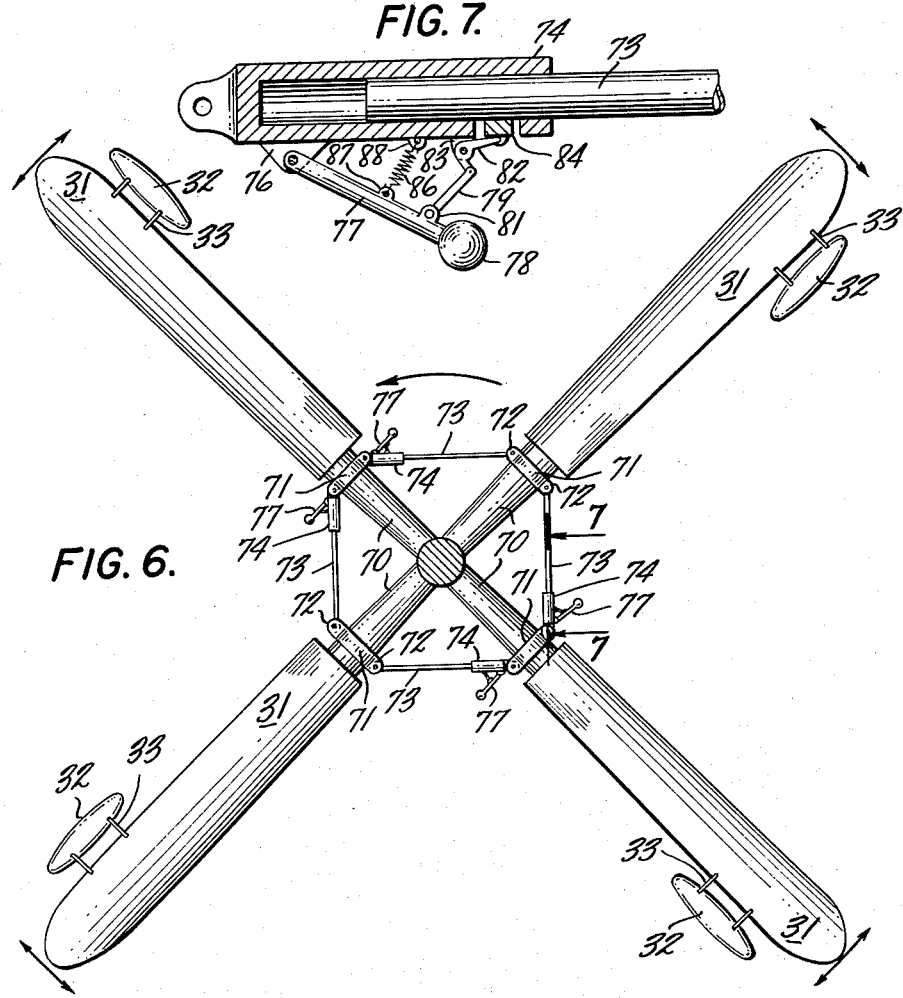
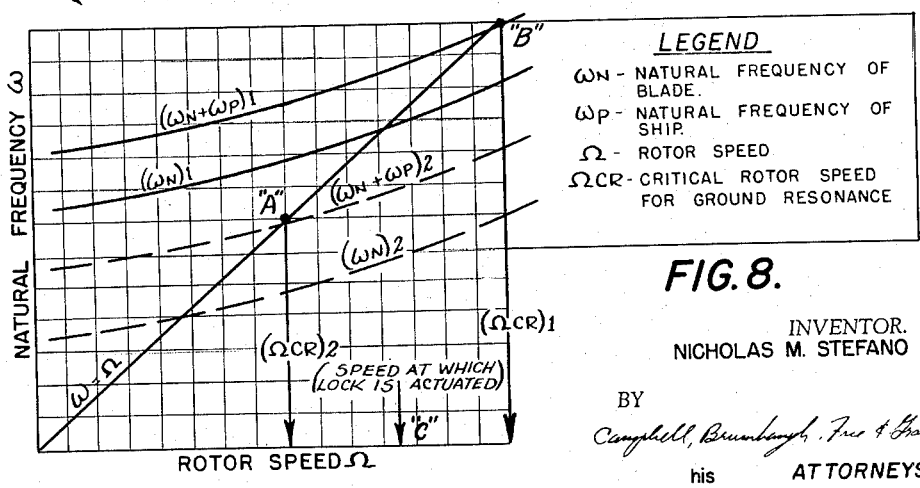
INVENTOR.
NICHOLAS M. STEFANO
BY
his ATTORNEYS.

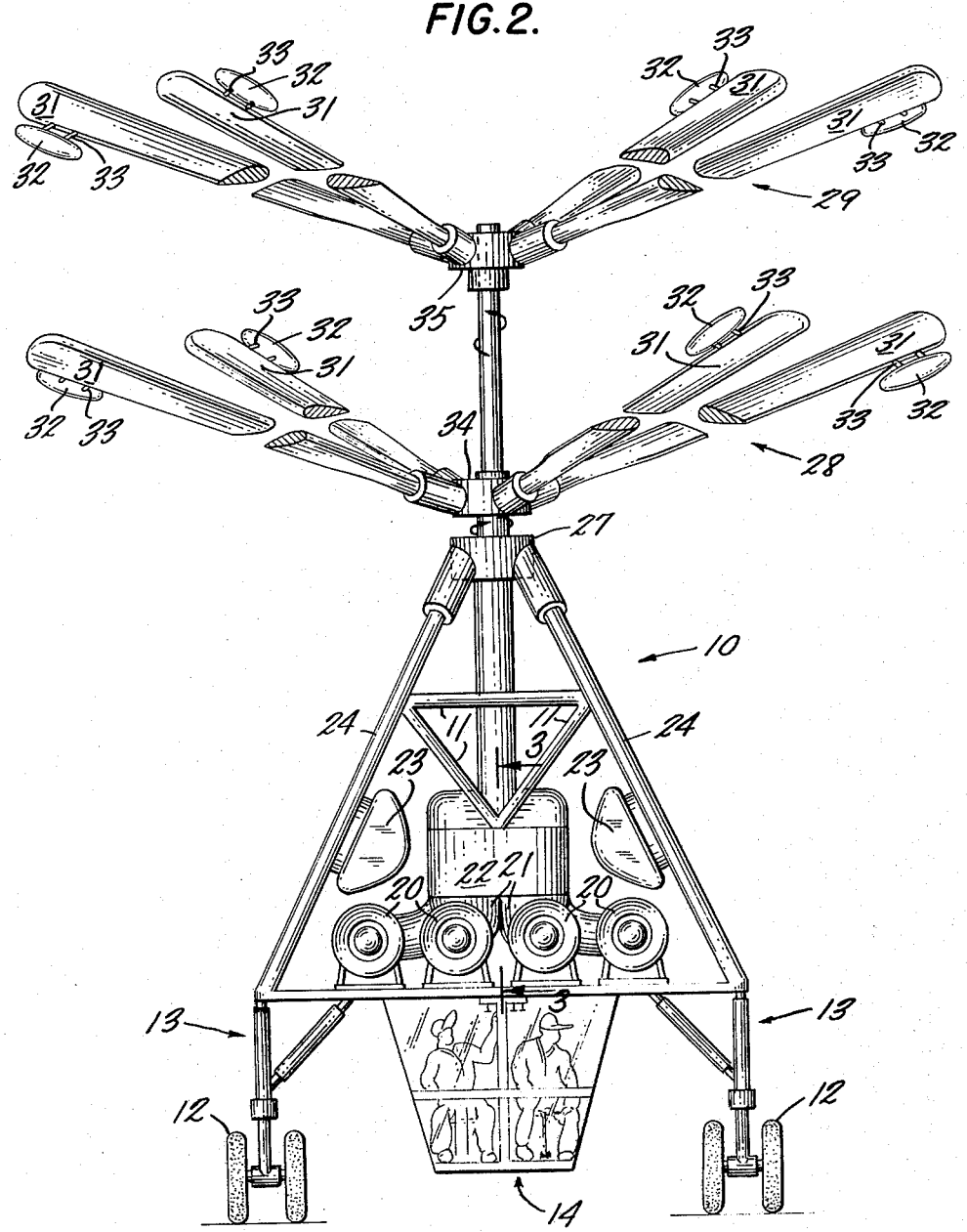

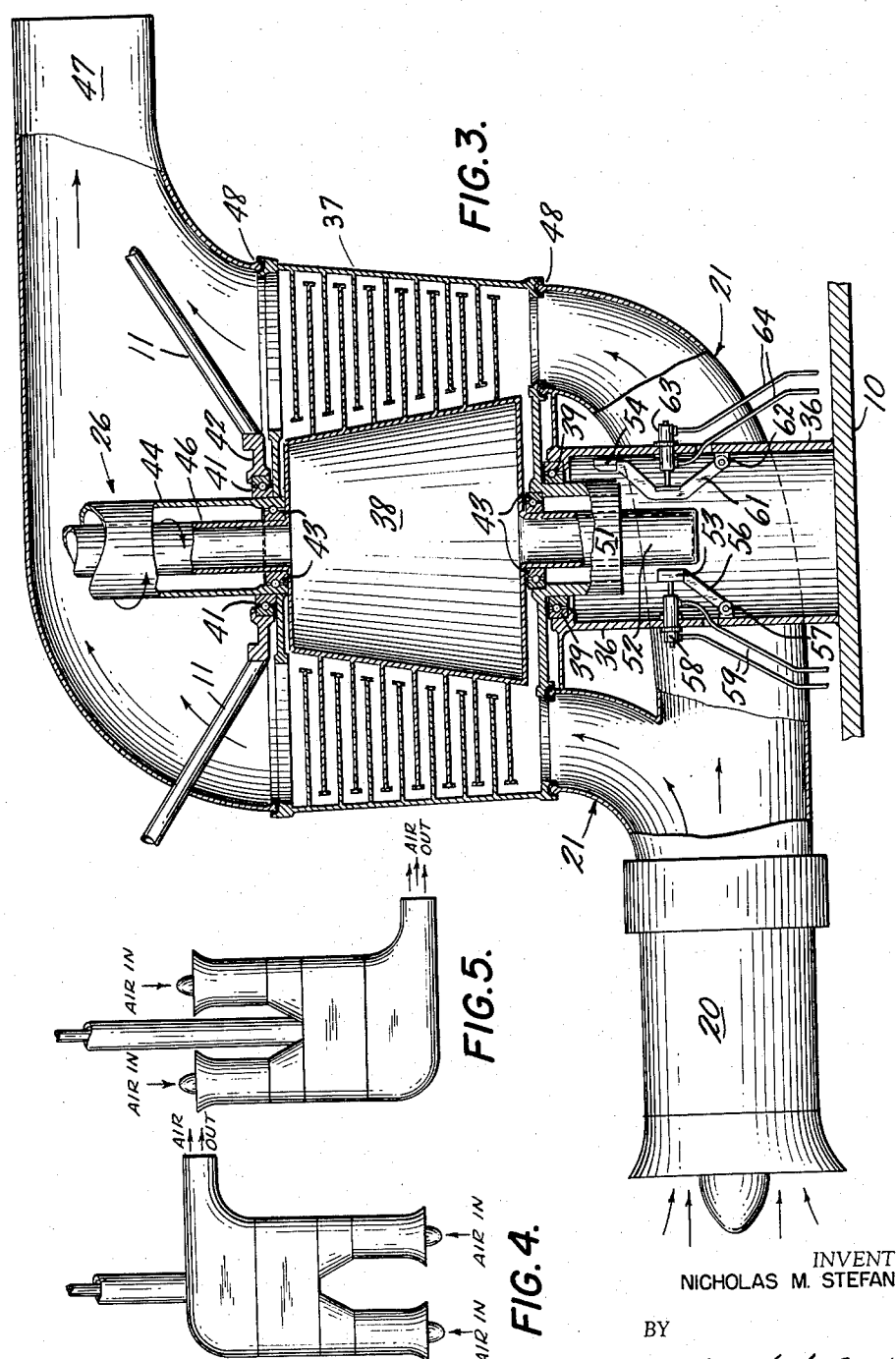

3,002,711
HELICOPTER
Nicholas M. Stefano, Port Washington, N.Y., assignor to Fairchild Stratos Corporation, a corporation of Maryland
Filed Sept. 5, 1956, Ser. No. 608,099
8 Claims. (Cl. 244—17.23)

The present invention relates to helicopters and more particularly to cargo helicopters for transporting bulky cargo exteriorly in the manner of a "flying crane."

The helicopters heretofore known have contained complicated rotor systems, drive mechanisms, and transmission devices. In addition, the rotor hub generally involves complicated means for providing cyclic pitch of the articulated rotor blades. The resulting machine is complicated to operate and expensive to produce and maintain.

The present helicopter is to be used as a "flying crane" to lift bulky cargo while hovering, transport to another location and lower the cargo while still hovering. The speed at which such a machine will travel will be slow compared to present day air speeds, as for example, in the order of 65–70 miles per hour. At such slow speeds, the first harmonic blade flapping motion will be reduced thereby reducing both the first harmonic blade flapping loads and the amount of cyclic feathering of the rotor blades needed to maintain proper trim or stability of the machine.

Generally, the invention provides a relatively simple, light-weight structural pyramid-like open framework as a body or fuselage. A light-weight, short-legged, four-wheel landing gear, which need be only sufficiently strong to land the helicopter without the cargo load, is secured to the underside of the fuselage. One or more small jet engines mounted in the open-frame fuselage act as gas generators to drive a power turbine. The power turbine operates at a relatively low speed, for example, approximately 140 revolutions per minute, to drive directly counter-rotating rotor blades.

To achieve a reasonable turbine efficiency, the stator of the power turbine rotates in the opposite direction from the rotor, which is, in effect, a co-axial rotor system rotating on co-axial turbine shafts, thereby permitting the turbine diameter to be approximately one-half that required in turbines heretofore used wherein the stators are stationary. A counter-rotating co-axial rotor blade system with non-articulated rotor blades is secured directly to the power turbine's co-axial rotor shafts. The rotor blades are rigid and resist a bending force but at the same time are somewhat flexible in torsion so that they may be twisted or warped for cyclic and collective pitch control. A rotor blade control system is provided by means of an additional plane surface near the trailing edge of each of the blade tips to twist forcibly the blades for cyclic and collective pitch control. Friction brake shoes selectively bear against one or the other of the two counter-rotating co-axial turbine shafts to provide for yaw control. To prevent ground reasonance when the machine is operated at low altitudes or on the ground, a system of rod and sleeve connections is provided between adjacent rotor blades. The helicopter is equipped with a powered winch which is centrally located at the underside of the body or fuselage for hoisting, lowering and transporting cargo loads.

Accordingly, it is one of the objects of the present invention to provide a cargo helicopter free from mechanical transmissions and centrifugal or over-running clutches.

Another object of the present invention is to provide a slow speed, direct drive, free turbine to supply power to the rotor blades.

Still another object of the present nivention is to provide one or more jet engines as gas generators to supply a relatively low temperature jet exhaust to drive the turbine thereby practically eliminating the centrifugal stress problem in the turbine buckets.

A further object of the present invention is to provide a non-articulated rotor system to simplify the rotor hub which in turn provides for a substantial reduction in construction and maintenance costs.

A still further object of the present invention is to eliminate the need for heavy, expensive, hydraulic servo systems by providing plane surfaces to adjust the rotor blade twist for cyclic and collective pitch control.

Another object of the present invention is to provide for a counter-rotating turbine drive and counter-rotating rotor blades whereby conventional tail rotors, tail rotor drive mechanisms, tail booms and tail rotor controls are eliminated.

Still another object of the present invention is to provide an automatic rotor blade stiffener to prevent ground resonance.

Other objects and advantages will become apparent to one skilled in the art to which the invention pertains from the following detailed description of the present preferred embodiment thereof described with respect to the accompanying drawings in which similar reference characters represent corresponding parts in the several views, in which:

FIGURE 2 is a front elevation illustrating the helicopter of the present invention;

FIGURE 3 is a side view partially in cross section taken along the line 3—3 in FIGURE 2, showing the power plant for driving the rotors of the present helicopter;

FIGURE 4 illustrates an alternate arrangement for mounting the helicopter power plant;

FIGURE 5 illustrates a still further alternate arrangement for mounting the helicopter power plant;

FIGURE 6 illustrates the rod and sleeve arrangement for automatic stiffness control of the rotor blades;

FIGURE 7 illustrates the rod and sleeve control, taken partially in cross section along line 7—7 of FIGURE 6, to control automatically the stiffness of the rotor blades; and FIGURE 8 is a graph illustrating the effect of the automatic stiffness control in overcoming ground resonance.

Figure 1:
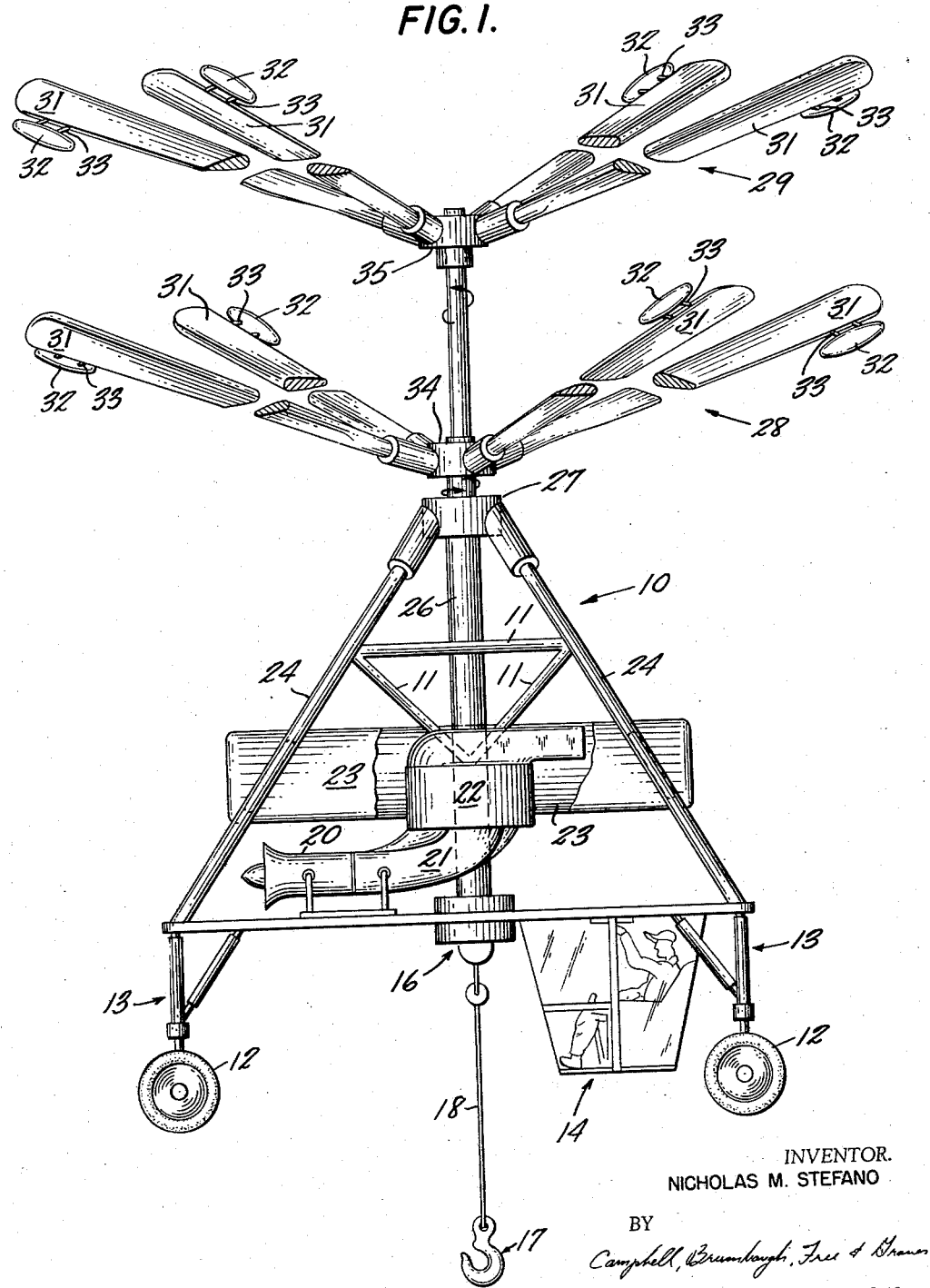
FIGURE 1 is a side elevation illustrating the helicopter of the present invention.

Referring to FIGURES 1 and 2 of the drawings, the body or fuselage 10 of the helicopter is an open pyramid-like frame with suitable bracing members 11 to assure structural rigidity. Landing wheels 12 are mounted on the underside of the fuselage 10 at each of the four corners by suitable supports 13 which may be any well-known type. These wheels 12 and supports 13 need only be sufficiently strong to support the helicopter on the ground without a cargo load. An operator car or cockpit 14 is also mounted on the underside of the fuselage 10 in such a manner as not to obstruct the view of the operator. A power winch 16 is secured to the fuselage 10 to raise or lower a hook 17 or other attaching mechanism on which a cargo load may be attached. A rope, cable or other flexible means 18 is used to operably connect the hook 17 to the power winch 16.

Mounted in the open framework of the fuselage 10 is a plurality of jet engines 20. Each of the jet engines 20 supplies jet exhaust gas through suitable ducts or manifolds 21 to a power turbine 22. Fuel tanks 23 for the jet engines 20 may be mounted in any suitable position on the fuselage 10, as, for example, on the inside of the upright structural members 24. A co-axial rotor shaft assembly 26 is journaled in the upper part of the fuselage 10 in a bearing 27, the lower end of the co-axial rotor shaft assembly 26 being secured directly to the turbine rotors 37 and 38 (FIGURE 3) located within the power turbine 22. The upper portion of the coaxial rotor shaft assembly 26 supports a pair of counter-rotating rotors 28 and 29, each consisting of four blades 31. Each of the eight rotor blades 31 is provided with a moveable plate or airfoil 32 supported from the rotor's trailing edge by a pair of hinge arms 33. These plates 32 are operable from the operator's cockpit 14 by means of flexible control cables or rods (not shown) housed within the rotor blades and connected through "swash" plates (not shown) at the rotor hubs 34 and 35 to suitable rod linkages extending to the operator's station in the cockpit 14. The control mechanism for the airfoils may be any of the usual type well known in the art, as, for example, the mechanism of Vincent Bendix, Patent No. 2,448,073.

FIGURE 3 illustrates the power plant for driving the rotors 28 and 29 of the present helicopter. The turbine 22 is supported by a member 36 attached to the fuselage structure 10 and is composed, basically, of an outer turbine rotor assembly 37 and an inner turbine rotor assembly 38. The outer turbine rotor 37 revolves on suitable bearings 39 in the top of the turbine support member 36 and on suitable bearings 41 in a bearing retainer ring 42 which is, in turn, supported by brace members 11 of the fuselage structure 10. The inner rotor 38 revolves on bearing assemblies 43 carried by the outer rotor 37.

The helicopter rotor blade shaft assembly 26 is composed of an outer hollow shaft 44 which is connected to and driven in a counterclockwise direction by the outer turbine rotor 37 and an inner shaft 46 connected to and driven in a clockwise direction by the inner turbine rotor 38.

The gases (indicated by arrows in FIGURE 3) generated by the four turbo-jet engines 20 are conducted to the single turbine 22, by means of suitable ducts 21, to form a single input manifold. After the hot gases have passed through the turbine 22, they are exhausted rearwardly to the atmosphere by additional duct means 47. Suitable seals 48 are provided between the turbine 22 and the duct means 21 and 47.

Although the jet power plants are indicated as being mounted horizontally on the fuselage framework with their entrance ducts facing in a forward direction, it is to be understood that these units may be mounted vertically with their entrance ducts facing downward, as shown in FIGURE 4, or they may be mounted vertically with the entrance ducts facing upwardly as shown in FIGURE 5. The arrangement shown in FIGURE 5 has a certain advantage over the arrangements of FIGURES 3 and 4 in that foreign objects such as dirt, rocks, sand, etc. are less likely to be sucked into the entrance ducts of the jet engines in such position.

To control the helicopter about the vertical axis (i.e. yaw control), a system of friction brakes is provided as shown in FIGURE 3. The two turbine rotors 37 and 38 are provided with extensions 51 and 52 within the turbine support 36. Two brake shoes 53 and 54 are provided in such a position that the first brake shoe 53 is actuable against the extension 52 of the inner turbine rotor 38, and the second brake shoe 54 is situated so as to be actuable against the extension 51 of the outer turbine rotor 37. The first brake shoe 53 is supported by an arm 56 pivoted on a lug 57 attached to the wall of the turbine support member 36 so as to press the first brake shoe 53 against the extension 52 of the inner turbine rotor 38 when hydraulic fluid is introduced into one end of a hydraulic actuator 58 through a suitable fluid pressure line 59. As the first brake shoe 53 presses against the extension 52 of the inner turbine rotor 38, the entire helicopter is caused to turn about the vertical axis in the direction that the inner turbine rotor 38 is turning.

The second brake shoe 54 is supported by an arm 61 which is pivoted about a lug 62 on the turbine support 36. The second brake shoe 54 will press against the extension 51 of the outer turbine rotor 37 when hydraulic pressure is introduced into an actuator 63 which is similar to actuator 58. The helicopter will then turn in the opposite direction as that just described in connection with the first brake shoe 53. The second hydraulic actuator 63 is controlled by fluid pressure in hydraulic fluid lines 64 in a manner similar to that described for the first hydraulic actuator 58. These fluid lines 59 and 64 extend to a suitable pump and directional control valve (not shown) in the control cockpit 14 for operation by the operator to selectively actuate the two brake means 53 and 54.

One of the problems encountered in helicopter rotors is known as "ground resonance" which is a fore and aft vibration or oscillation of the rotor blades (indicated by arrows at the blade tips in FIGURE 6) coupled with a rolling and/or pitching motion of the fuselage, occurring when the rotors are turning at some critical speed which usually falls somewhere between the very low and high operating speeds. This "ground resonance" is overcome in the present invention by adding artificial stiffness to the blades to vary their natural frequency. As shown in the graph, FIGURE 8, a helicopter will encounter ground resonance at some point of critical speed indicated at "A." If the stiffness of the rotor blades could be increased, the critical speed before ground resonance is encountered would be increased also, up to some speed such as "B" on the graph. If once the "B" speed is approached with the blades on the stiffened condition, and then the blades are suddenly "unstiffened," the critical speed would be immediately shifted back to the point "A,'" and since the rotor speed is already past this cricital point, the rotor speed can be increased into the high speed range without encountering resonance.

Referring now to FIGURE 6 of the drawings, the arrows at the blade tips indicate the resonance or oscillation of the rotor blades 31. To overcome this resonance effect, a rod and sleeve connection is provided between adjacent rotor blades. Colors 71 on two opposite blades are provided with pivot attachments 72 for brace rods 73 which extend to the next adjacent rotor blade. The ends of the brace rods 73 which extend to the next adjacent rotor blades are entered into a sleeve 74 which is pivoted at the rotor blade collar 71.

In FIGURE 7, the rod 73 is shown slidable in the sleeve 74 in cylinder-piston fashion. The sleeve 74 is provided with a mounting lug 76 on which is pivoted an arm 77 having a counter-weight 78 on the end thereof. A second arm 79 is pivotally attached at one end to a lug 81 on the arm 77 and at its opposite end to one end of a bell crank 82 pivoted on another lug 33 attached to the side of the sleeve 74. The other end of the bell crank 82 carries a brake shoe 84 which bears against the rod 73 through an opening in the sleeve 74. A coil tension spring 86 attached between a lug 87 on the arm 77 and a similar lug 88 on the sleeve 74 urges the arm 77 toward the sleeve 74.

The mechanism just described is normally in the

"stiffened position" which imparts a certain degree of stiffness to the rotor blades due to the rigid connection between adjacent blades. As the rotor increases its rotational speed, it passes through the critical speed "A" without resonance (shown in FIGURE 8). As it reaches some preselected speed between "A" and "B," the spring load 86 is released by the centrifugal force acting on the counterweight 78 which allows the arm 77 to pivot in a direction away from the sleeve 74. Such action moves the bell crank 82 to release the pressure of the brake shoe 84 against the rod 73 which allows the rod 73 to slide freely within the sleeve 74. In such condition, the blades 31 are in the "unstiffened" condition and rotational speed may be safely increased even beyond the critical speed of the rotor with "stiffened blades." As the rotor speed is reduced, the mechanism is actuated at a preselected speed, "C," to "stiffen" the blade, and the rotor speed passes through the critical point "A" without encountering vibration or resonance.

Although the helicopter of the present invention has been shown and described in its preferred embodiment as having a rigid rotor system, there may be instances in which speed, size or other factors would increase the loads in the rotor blades to such extent as to make the use of a flexible mounting for the rotor blades more efficient. Accordingly, it is contemplated that instead of the rigid attachment of the rotor blade assembly to the rotor shaft, a system of "teetering" rotors would be used. Such an arrangement would be readily accomplished by attaching the two hubs of the rotor blade assemblies to their respective rotor shafts by means of a universal joint to allow the rotor blades to tilt or rock about the respective shaft assemblies to absorb excessive loads.

The invention has been shown by way of example only, and many modifications and variations may be made therein without departing from the spirit of the invention. Therefore, it is understood that the invention is not to be limited to any specified form or embodiment except insofar as such limitations are set forth in the claims.

I claim:
1. A helicopter comprising a fuselage formed of a horizontal support frame, substantially rigid members fixedly attached at spaced apart points on said frame and converging upwardly at an angle with said frame, a first bearing means fixed between the upper ends of said substantially rigid members, a second bearing means fixedly mounted on said support frame at a point in substantially vertical alignment with said first bearing means, a cabin depending from said support frame substantially rearwardly of said second bearing means; a turbine power plant mounted on said support frame, said turbine power plant comprising a pair counter-rotating turbine rotors supported to rotate about an axis common with the axis through said first and second bearing means, a plurality of gas generators connected to said power plant to rotate said turbine rotors; coaxial rotor blade shafts supported by said first and second bearing means, a plurality of rotor blades connected to each of said coaxial rotor blade shafts, means connecting one of said shafts to one of said pair of turbine rotors, means connecting the other of said shafts to the other of said turbine rotors, and means associated with said rotor blade shafts for operably controlling the yaw of the helicopter.

2. A helicopter comprising a fuselage formed of a horizontal support frame, substantially rigid members fixedly attached at spaced apart points on said frame and extending upwardly from said frame, a first bearing means mounted adjacent to the upper ends of said substantially rigid members, a second bearing means fixedly mounted on said support frame at a point in substantial vertical alignment with said first bearing means, a cabin depending from said support frame substantially rearwardly of said second bearing means, a turbine power plane mounted on said support frame, said turbine power plant comprising a pair of counter-rotating turbine rotors supported to rotate about an axis common with the axis through said first and second bearing means, a plurality of gas generators connected to said power plant to rotate said turbine rotors, coaxial rotor blade shafts supported by said first and second bearing means, a plurality of rotor blades connected to each of said coaxial rotor blade shafts, means connecting one of said shafts to one of said pair of turbine rotors, means connecting the other of said shafts to the other of said turbine rotors, and means associated with said rotor blade shafts for operably controlling the yaw of the helicopter.

3. A helicopter comprising a fuselage formed of a horizontal support frame, substantially rigid members fixedly attached at spaced apart points on said frame and converging upwardly at an angle with said frame, a first bearing means fixed between the upper ends of said substantially rigid members, a second bearing means fixedly mounted on said support frame at a point in substantially vertical alignment with said first bearing means, a cabin supported by said support frame, a turbine power plant mounted on the other side of said support frame whereby the view from said cabin is unobstructed, said turbine power plant comprising a pair of counter-rotating turbine rotors supported to rotate about an axis common with the axis through said first and second bearing means, a plurality of gas generators connected to said power plant to rotate said turbine rotors, coaxial rotor blade shafts supported by said first and second bearing means, a plurality of rotor blades connected to each of said coaxial rotor blade shafts, means connecting one of said shafts to one of said pair of turbine rotors, means connecting the other of said shafts to the other of said turbine rotors, and means associated with said rotor blade shafts for operably controlling the yaw of the helicopter.

4. A helicopter comprising a fuselage formed of a horizontal support frame substantially rigid members fixedly attached at spaced apart points on said frame and extending upwardly from said frame, a first bearing means fixed between upper ends of said rigid members, a second bearing means fixedly mounted on said support frame at a point in substantial vertical alignment with said first bearing means, a turbine power plant mounted on said support frame, a cabin mounted on said support frame and positioned to have the view from said cabin unobstructed by said turbine power plant, said turbine power plant comprising a pair of counter-rotating turbine rotors supported to rotate about an axis common with the axis through said first and second bearing means, a plurality of gas generators connected to said power plant to rotate said turbine rotors, coaxial rotor blade shafts supported by said first and second bearing means, a plurality of rotor blades connected to each of said coaxial rotor blade shafts, means connecting one of said shafts to one of said pair of turbine rotors, means connecting the other of said shafts to the other of said turbine rotors, and means associated with said rotor blade shafts for operably controlling the yaw of the helicopter.

5. A helicopter as set forth in claim 1 wherein said counter-rotating turbine rotors include inner and outer rotors connected to one end of a manifold through which the gases of said gas generators flow.

6. A helicopter as set forth in claim 1 wherein said gas generators comprise a plurality of jet engines the exhaust gases of which are connected separately to an input manifold, said turbine rotors being rotatably energized by the gases conducted through said manifold.

7. A helicopter as set forth in claim 1 wherein fuel storage means is carried by said rigid members.

8. A helicopter as set forth in claim 1 wherein a landing device is attached to the undersurface of said support frame.

References Cited in the file of this patent
UNITED STATES PATENTS

| | | |
|---|---|---|
| 1,836,406 | Smith | Dec. 15, 1931 |
| 2,416,178 | Kearns | Feb. 18, 1947 |
| 2,435,360 | Leiner | Feb. 3, 1948 |
| 2,451,944 | Hall | Oct. 19, 1948 |
| 2,468,009 | Bigley et al. | Apr. 19, 1949 |
| 2,478,206 | Redding | Aug. 9, 1949 |
| 2,619,797 | Haworth | Dec. 2, 1952 |
| 2,738,939 | Johnson | Mar. 20, 1956 |

FOREIGN PATENTS

| | | |
|---|---|---|
| 521,218 | Great Britain | May 15, 1940 |
| 594,207 | Great Britain | Nov. 5, 1947 |
| 1,029,081 | France | Mar. 4, 1953 |

UNITED STATES PATENT OFFICE
CERTIFICATE OF CORRECTION

Patent No. 3,002,711  October 3, 1961

Nicholas M. Stefano

It is hereby certified that error appears in the above numbered patent requiring correction and that the said Letters Patent should read as corrected below.

Column 1, line 59, for "reasonance" read -- resonance --; column 2, line 8, for "nivention" read -- invention --; column 4, line 56, for "Colors" read -- Collars --; line 68, for "33" read -- 83 --; column 6, line 3, for "plane" read -- plant --.

Signed and sealed this 13th day of March 1962.

(SEAL)
Attest:

ERNEST W. SWIDER  DAVID L. LADD
Attesting Officer  Commissioner of Patents